United States Patent
Grutzeck et al.

(10) Patent No.: US 12,442,782 B2
(45) Date of Patent: Oct. 14, 2025

(54) GAS SENSOR, MANUFACTURING METHOD, AND DETECTION METHOD

(71) Applicant: Robert Bosch GmbH, Stuttgart (DE)

(72) Inventors: Helmut Grutzeck, Kusterdingen (DE); Renate Mueller, Reutlingen (DE); Stefan Zehringer, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 305 days.

(21) Appl. No.: 18/150,471

(22) Filed: Jan. 5, 2023

(65) Prior Publication Data

US 2023/0221270 A1 Jul. 13, 2023

(30) Foreign Application Priority Data

Jan. 11, 2022 (DE) .................... 10 2022 200 184.2

(51) Int. Cl.
| | |
|---|---|
| *G01N 25/18* | (2006.01) |
| *G01N 27/22* | (2006.01) |
| *G01N 35/00* | (2006.01) |
| *G01R 27/26* | (2006.01) |

(52) U.S. Cl.
CPC ........... *G01N 25/18* (2013.01); *G01N 27/221* (2013.01); *G01N 35/00584* (2013.01); *G01R 27/2629* (2013.01); *G01N 2027/222* (2013.01); *G01N 2035/00306* (2013.01)

(58) Field of Classification Search
CPC ................. G01N 25/18; G01N 27/221; G01N 35/00584; G01N 2027/222; G01N 2035/00306; G01N 27/18; G01R 27/2629
See application file for complete search history.

(56) References Cited

U.S. PATENT DOCUMENTS

| | | | |
|---|---|---|---|
| 2015/0128703 A1 | 5/2015 | Kaelberer et al. | |
| 2018/0162722 A1* | 6/2018 | Male | B81B 7/0048 |
| 2022/0120701 A1 | 4/2022 | Udrea et al. | |
| 2024/0151675 A1* | 5/2024 | Dilger | G01N 27/18 |

FOREIGN PATENT DOCUMENTS

| | | | |
|---|---|---|---|
| DE | 10146321 A1 | | 4/2003 |
| DE | 102016200270 A1 | | 7/2017 |
| DE | 102016201021 A1 | * | 7/2017 |
| DE | 102018119212 A1 | | 2/2020 |
| DE | 112020001589 T5 | | 12/2021 |
| DE | 102020211102 A1 | | 3/2022 |
| EP | 0076935 A2 | | 4/1983 |

* cited by examiner

*Primary Examiner* — Peter J Macchiarolo
*Assistant Examiner* — Tim Graves
(74) *Attorney, Agent, or Firm* — NORTON ROSE FULBRIGHT US LLP

(57) ABSTRACT

A gas sensor for detecting a physical and/or chemical value of an analysis gas, a corresponding manufacturing method, and operating method. The gas sensor is based on the principle of a thermal conductivity measurement with the aid of a sensor structure including a double meander structure made up of two resistor lines, as part of a Wheatstone bridge circuit, on a diaphragm of a substrate. The two resistor lines are energized in opposite directions as a function of the detected temperature. The physical and/or chemical value(s) of the analysis gas are/is subsequently determined as a function of the voltages detected at the double meander structure.

12 Claims, 7 Drawing Sheets

GAS SENSOR, MANUFACTURING METHOD, AND DETECTION METHOD

CROSS REFERENCE

The present application claims the benefit under 35 U.S.C. § 119 of German Patent Application No. DE 10 2022 200 184.2 filed on Jan. 11, 2022, which is expressly incorporated herein in its entirety.

FIELD

The present invention relates to a sensor for detecting a gas with the aid of a thermal conductivity measurement, and a manufacturing method and an operating method for this type of gas sensor.

BACKGROUND INFORMATION

Various sensors using different physical and/or chemical detection methods are available for detecting gases. Thus, concentrations as well as the presence of certain gases or gas components may be detected with the aid of metal oxide conductivity sensors, ChemFET sensors, or optical sensors.

Thermal conductivity sensors are likewise suited for detecting light gases such as hydrogen and helium, since their thermal conductivity, due to the low molecular weight, differs greatly from other gases in the air.

By use of the present invention, the intent is to provide a simplified design of a gas sensor in which only the necessary detection means for determining the gas composition are to be used in a targeted manner.

SUMMARY

With the present invention, a gas sensor for detecting a physical and/or chemical value of an analysis gas and also a corresponding manufacturing method and operating method are provided. According to an example embodiment of the present invention, for the gas sensor, the principle of thermal conductivity measurement with the aid of a heatable sensor structure, made up of a double meander structure including two resistor lines as part of a Wheatstone bridge circuit on a diaphragm of a substrate, is used. Features of the present invention include that the two resistor lines are energized in opposite directions as a function of the detected temperature. The physical and/or chemical value(s) of the analysis gas are/is subsequently determined as a function of the voltages detected at the double meander structure.

Due to the oppositely directed energization of the double meander structure, the output signal is doubled compared to a single meander structure, so that the surface area needed for the actual sensor element may be smaller.

In one particular embodiment of the present invention, it is provided that a cavity is created in the substrate beneath the diaphragm. Due to the fact that the diaphragm is permeable to the analysis gas to be analyzed or at least to the portion of the analysis gas to be analyzed, a cavity may be defined, into which the gas to be analyzed diffuses in a targeted manner.

One refinement of the present invention includes, in addition to the first double meander structure, a second double meander structure on a second diaphragm that is separate from the first diaphragm. It is provided that the second double meander structure has a different resistance value, preferably a greater resistance value, than the first double meander structure. By using, for example, the same current intensity for energizing both double meander structures, different temperatures may be achieved, as the result of which a nonlinearity of the gas may be detected due to the different heat output of the gas.

According to an example embodiment of the present invention, it is also optionally possible to add a reference double meander structure to at least one of the double meander structures. For this purpose, the reference double meander structure, away from the double meander structure, may likewise be applied to the substrate and connected thereto in series. It is in particular provided that the reference double meander structure is not applied to a diaphragm.

For stress decoupling, the diaphragm and/or the cavity may be provided in a structure of the substrate that is decoupled from the remainder of the substrate or from a frame of the substrate. This decoupling may take place, for example, with the aid of a bridge that has been structured out of the substrate. The bridge may have a stepped design in the lateral direction so that lateral stresses (for example, due to mechanical deformations or different thermal properties of the components) are not transferred from the frame to the decoupled structure. In addition, the electrical supply lines for the resistor lines may be led across the bridges.

To partition the sensor element or the sensor structure, made up of the diaphragm and double meander structure, or the decoupled structure as a whole, from the surroundings, a cap element which is preferably applied to the frame may additionally be provided.

Optionally, according to an example embodiment of the present invention, a temperature sensor may be provided that detects the temperature of the substrate, the diaphragm, and/or the analysis gas. The temperature value thus detected may likewise be taken into account in determining the physical and/or chemical value(s), for example by compensating for the influence of the substrate temperature in the determination.

The gas composition of the analysis gas, a certain component of the gas, or in general the thermal conductivity of the analysis gas, may be determined using the gas sensor or the evaluation method. In particular, light gases such as hydrogen or helium may be determined.

The gas sensor may be controlled, the sensor signals may be checked for plausibility (for example, checked for tolerances), and in general signal processing may take place, via an additional evaluation and/or control unit. External temperature signals may optionally be used for the evaluation instead of the temperature sensor provided on the sensor element.

The gas sensor mentioned above may be used for all applications in which hydrogen recognition is provided, in particular when the application is used with a hydrogen generator/a fuel cell. Use in automotive applications, for two-wheelers, for example motorcycle, bicycle, or scooter applications, as well as three-wheelers such as a tuk-tuk, is possible. In addition, the gas sensor may be used in the avionics sector, in applications for home and garden, and in consumer applications. The gas sensor may be used in smart phones, tablets, wearables, hearables, drones, and toys. Furthermore, numerous designs, revisions, modifications, deviations, variations, and specific embodiments, all of which fall under the range of applications of the present invention, are possible.

Further advantages result from the following description of exemplary embodiments and the figures.

DETAILED DESCRIPTION OF EXAMPLE EMBODIMENTS

Figure 1:
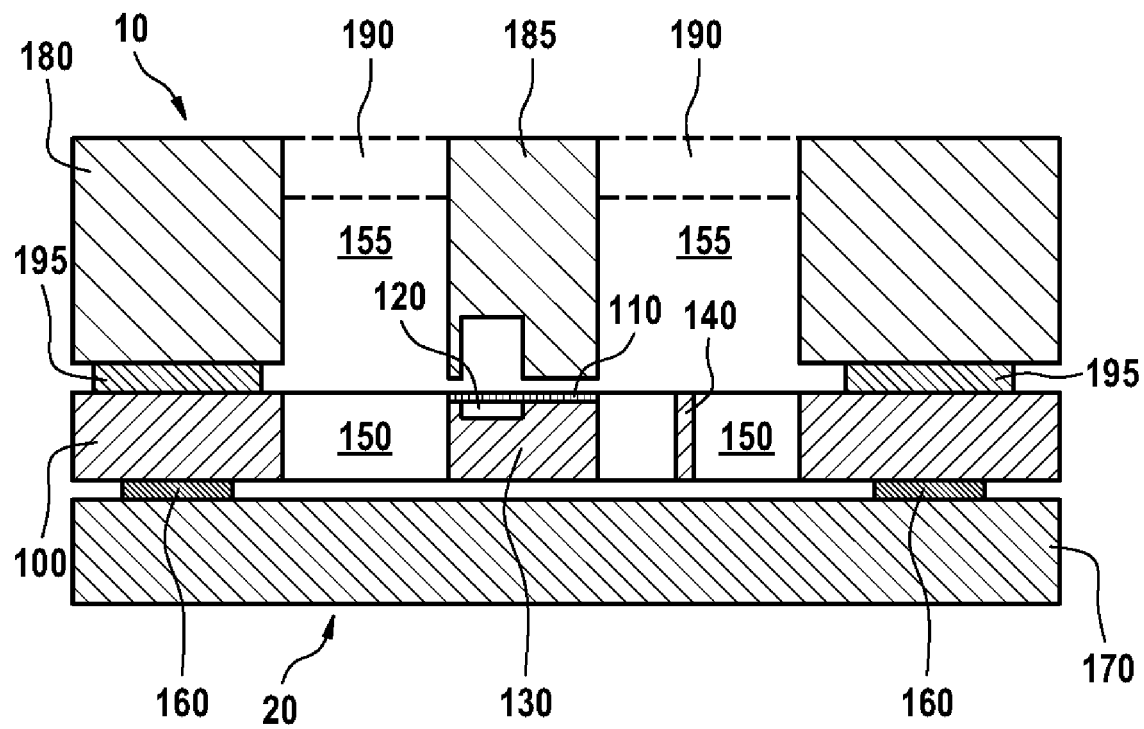
FIG. 1 schematically shows a first design of a gas sensor according to an example embodiment of the present invention in the form of a cross section.
Figure 2:
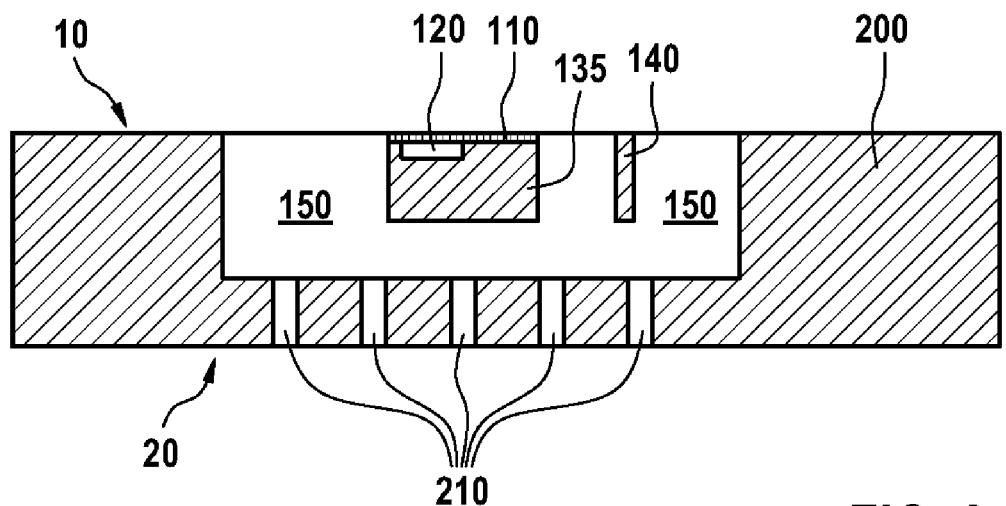
FIG. 2 illustrates an alternative design according to the present invention.

There are various variants in the design of the gas sensor according to the present invention, which are illustrated by way of example in FIGS. 1 and 2. Both designs share the common feature that a central structure 130 or 135 has been structured out of a substrate 100 or 200, respectively. When a semiconductor substrate 100 or 200 is used, the structuring and also the creation of the other elements/components of the gas sensor take place with the aid of conventional micromechanical methods, for example trench etching, sacrificial layer etching, and epitaxy methods.

Figure 3:
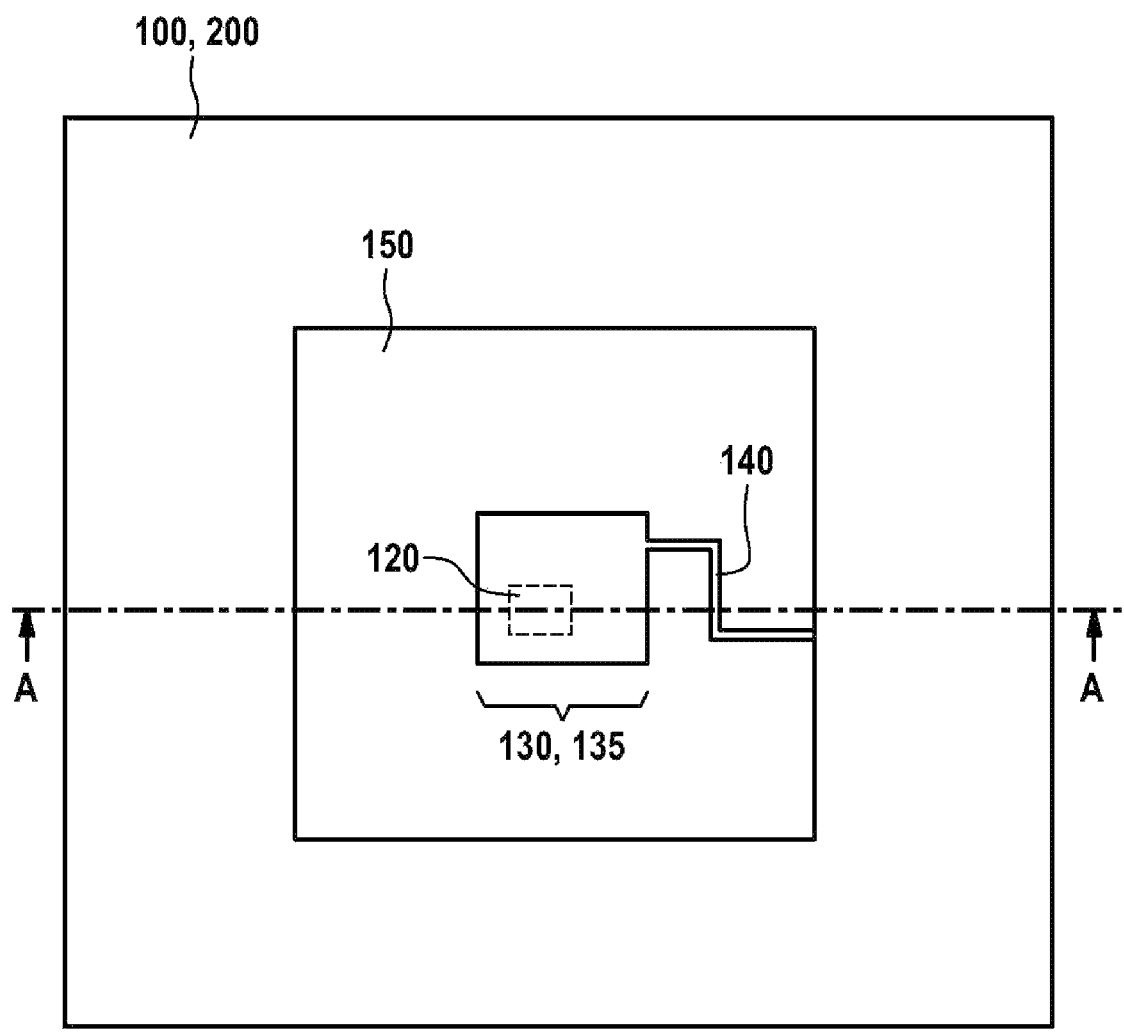
FIG. 3 shows a top view onto the gas sensor, according to an example embodiment of the present invention.

The embodiment according to FIG. 1 illustrates a cross section of the gas sensor according to line AA in the top view illustration in FIG. 3, and involves a semiconductor substrate 100 in which a recess 150 that extends through entire substrate 100 has been created. A central structure 130 has been left within recess 150, in which a cavity 120 with a diaphragm 110 situated thereabove has also been created. Diaphragm 110 may be designed in such a way that it is permeable to the gas to be detected. Resistor lines that are provided on diaphragm 110 and optionally away from diaphragm 110 on the top side of structure 130 are subsequently created (in this regard, see the following descriptions for FIGS. 3 through 5, among others). A bridge 140 that connects structure 130 to the edge of substrate 100 is provided for mechanical attachment, but at the same time also for stress and oscillation decoupling. As is apparent from the top view in FIG. 3, this bridge 140 has a step-like shape, so that lateral stresses resulting from thermal or mechanical effects on substrate 100 are not transferred to the actual sensor element on structure 130. Bridge 140 may have a curved shape instead of a stepped shape. In FIG. 3, the attachment of structure 130 is achieved solely via a one-sided attachment to frame 100. Alternatively, a two- or three-sided attachment may also take place, in particular in a symmetrized form. In addition to the mechanical mounting of structure 130, the electrical supply lines for the resistor lines may also be led across this bridge 140. In the example in FIG. 1, bridge 140 has the same or similar vertical extension as structure 130. This has the advantage that bridge 140 is stable enough for holding exposed structure 130, and at the same time has sufficient mass to absorb lateral oscillations or stresses. However, it may optionally also be provided that the vertical extension of bridge 140 is smaller or greater than the extension of structure 130.

FIG. 1 also schematically shows the further design of the gas sensor. Completely processed substrate 100 is mounted on a support element 170. The spaced-apart mounting for ensuring a distance between structure 130 and support element 170 takes place, for example, using sealing glass 160. Contacting between substrate 100 and support element 170 may optionally take place here as well, so that the electrical supply lines for the resistor lines may be continued. The example in FIG. 1 illustrates a cap 180, above substrate 100, that may be used for protecting the sensor element as well as for supplying the gas. For this purpose, the cap is preferably likewise structured out of a semiconductor substrate and connected, in particular in a pressure-tight manner, to the edge of substrate 100 via a corresponding connection 195. Above the actual sensor element of structure 130, the cap includes a further cap structure 185 that is provided with a recess and is spaced away from structure 130, and in particular from the double meander structure, at a distance of 1 μm to 10 μm, so that the analysis gas may pass from laterally situated supply opening 155 in the cap, above recess 150, to the sensor structure. Further cap structure 185 advantageously additionally includes a further recess above diaphragm 110 in order to provide a further gas volume in the vicinity of the sensor structure or of the double meander structure. A grid-shaped structure 190 may be situated above supply opening 155 in cap 180 to prevent the penetration of particles or other harmful materials.

Figure 9:
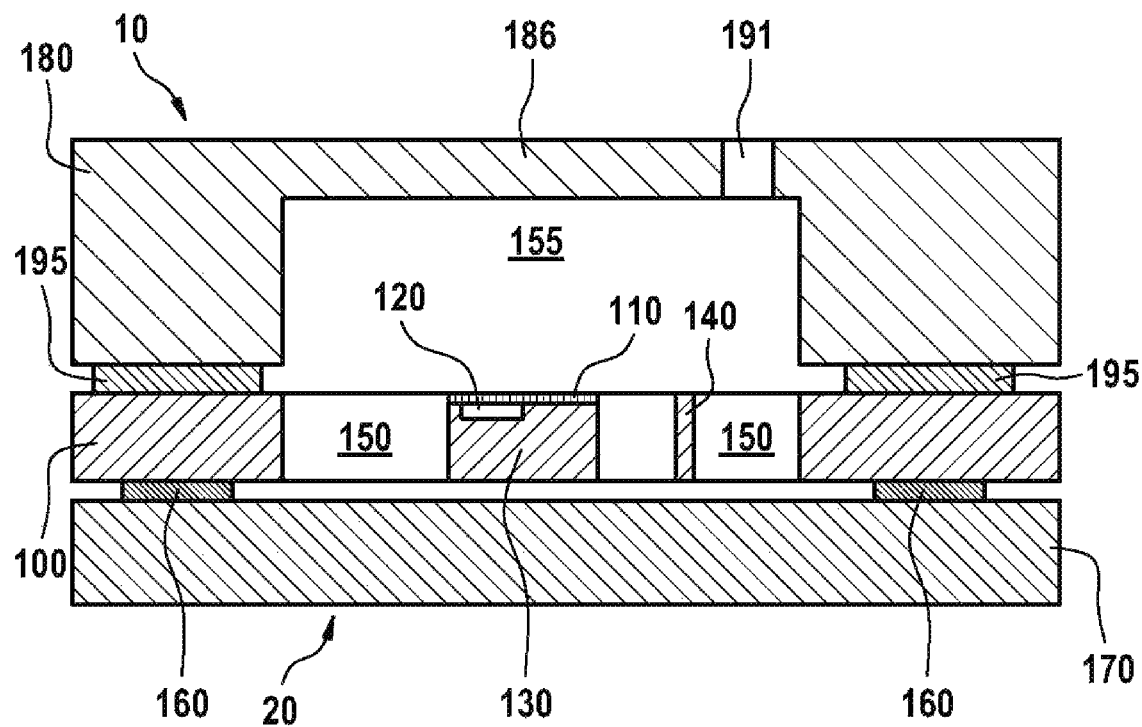
FIG. 9 shows another example embodiment of the present invention.

In a further specific embodiment according to FIG. 9, supply opening 155 in cap 180 above structure 130 spans entire recess 150. To allow supply or diffusion of the analysis gas into the space of supply opening 155, upper cover 186 of cap 180 includes an opening 191.

The specific embodiment of the gas sensor including a substrate 200 according to FIG. 2 differs from that in FIG. 1, in that recess 150 does not completely pass through substrate 200. Instead, with recess 150 a trough in which decoupled structure 130 and bridge 140 are situated is created from front side 10 of the substrate. To create this trough, access holes 210 may be provided from rear side 20 of substrate 200, which assist in the creation of the lower area of recess 150 with the aid of a cloud trench method (in this regard, see the description for FIG. 7). In addition, as described above for FIG. 1, a cap may likewise be applied. Optionally, substrate 200 may be directly utilized for the further processing, or likewise applied to a support element 170.

Figure 4:
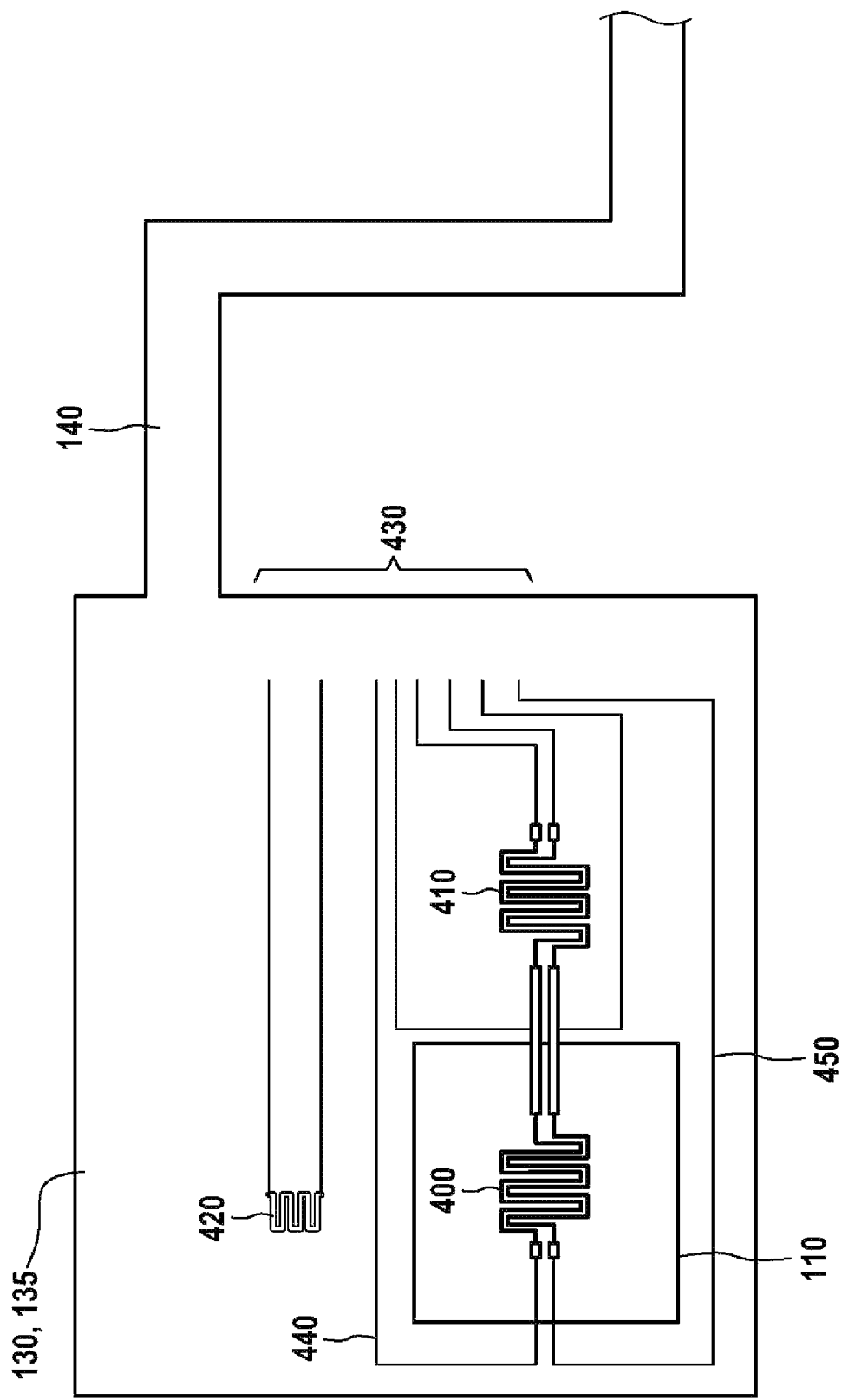
FIG. 4 shows one exemplary embodiment of the present invention in which a reference double meander structure is provided.

The design of the present invention is described in greater detail with reference to FIG. 4. Decoupled structure 130 or 135 together with bridge 140 which is stepped in the lateral direction is illustrated in the top view. In a first variant, for the thermal conductivity measurement, first double meander structure 400 in the form of a Wheatstone half-bridge on first diaphragm 110 made up of two resistor lines 440 and 450 is illustrated. The resistor lines of double meander structure 400 are designed in such a way that they are used as a heating element. To detect the heat dissipation by the analysis gas or its components, the two resistor lines 440 and 450 are energized in opposite directions. The analysis gas situated around double meander structure 400, in particular the analysis gas that has collected in the cavity through gas-permeable diaphragm 110, may subsequently absorb the emitted heat, as the result of which the measuring signal, i.e., the voltages at double meander structure 400, change(s). The gas composition of the analysis gas may ultimately be determined as a function of the voltages detected in this way. This is possible based on the knowledge and evaluation of the nonlinear thermal conductivities of the gases as a function of temperature. For this purpose, the meander must be operated in alternation at at least two supply voltages.

In addition to first diaphragm 110, a temperature sensor 420 may optionally be provided which supplies a temperature value that represents the temperature of the substrate, of diaphragm 100, of structure 130, and/or of the analysis gas. The external influence on the thermal conductivity of the gas may be compensated for using this temperature value.

In an optional further embodiment, the thermal conductivity measurement is carried out with the aid of a Wheatstone full bridge. For this purpose, in addition to above-mentioned first double meander structure 400, a first reference double meander structure 410 is provided next to first diaphragm 110 on structure 130. Both double meander structures 400 and 410 are connected in series, additional center taps being provided between the (double) meander structures for detecting the measuring signals, in particular the individual voltages in the corresponding (measuring) ranges.

Figure 5:
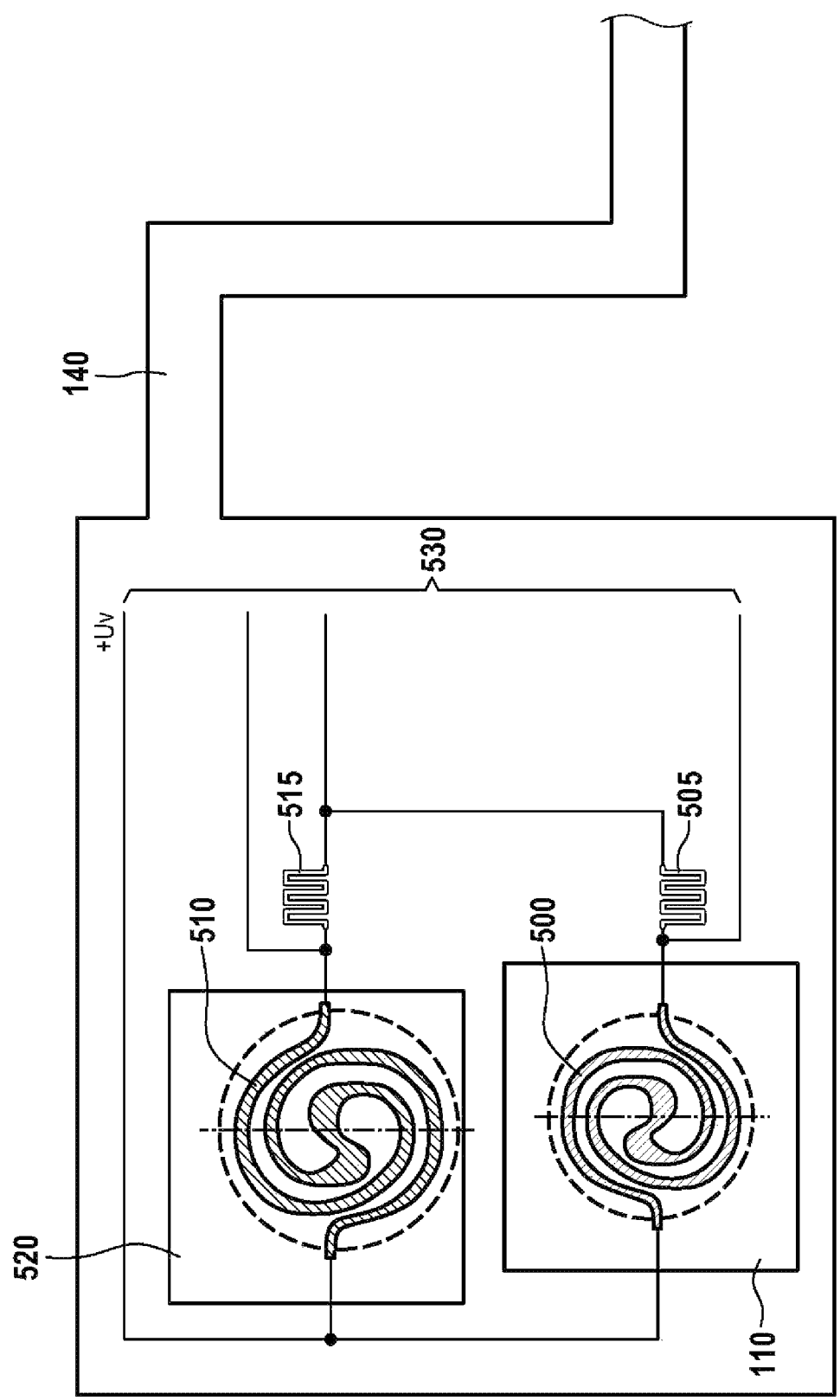
FIG. 5 illustrates one exemplary embodiment of the present invention in which a second double meander structure is provided.

In a further embodiment of the present invention, it may be provided to use two double meander structures 500 and 510 for detecting the thermal conductivity of the analysis gas, as shown in FIG. 5. Second double meander structure 510 is likewise made up of two resistor lines that are applied to a separate second diaphragm 520. However, the difference from first double meander structures 500 is that the resistances of the resistor lines of double meander structures 500 and 510 are different, so that a different temperature results when the two resistor lines are likewise oppositely energized with the same current intensity. In the process, second double meander structures 510 having a resistance that is greater than the resistance of first double meander structures 500 are advantageously provided. Optionally, in this embodiment one temperature sensor 505 may be provided, or a temperature sensor 505 and 515 may be respectively associated with each double meander structure. In a further alternative embodiment, a dedicated reference double meander structure may likewise be connected to each of double meander structures 500 and 510 (cf. FIG. 4 for comparison).

Figure 6:
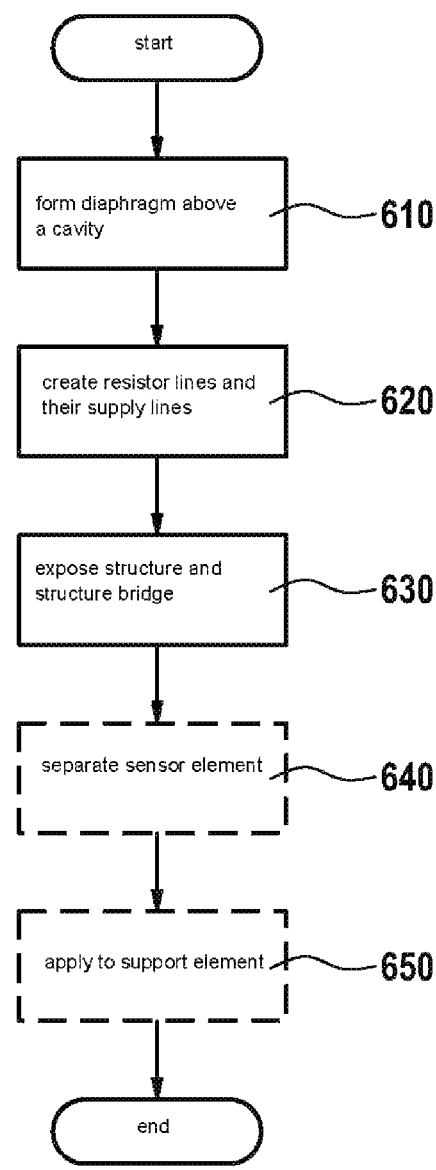
FIG. 6 shows a flow chart of one possible manufacturing method, according to an example embodiment of the present invention.

One possible method for manufacturing the gas sensor according to the present invention is described below, based on micromechanical method steps, with reference to the flowchart in FIG. 6. On a substrate, a diaphragm is formed above a cavity in a first step 610. The diaphragm may be formed as part of the substrate by undercutting, but also by using a sacrificial etching step with an epitaxial layer. Resistor lines as well as their supply lines are subsequently created on the substrate, and in particular a double meander structure is created on the diaphragm, in a step 620. This double meander structure in particular is designed in such a way that it represents a heating element for heating the analysis gas. Structure 130/135, which contains the diaphragm and the double meander structure, is exposed, and the bridge is structured as an attachment to the frame, in next step 630. The sensor element may optionally be separated in a subsequent step 640, and applied to a support element in a further step 650. In addition, a cap according to the embodiment in FIG. 1 may optionally be separately manufactured and applied to the substrate.

Figure 7:
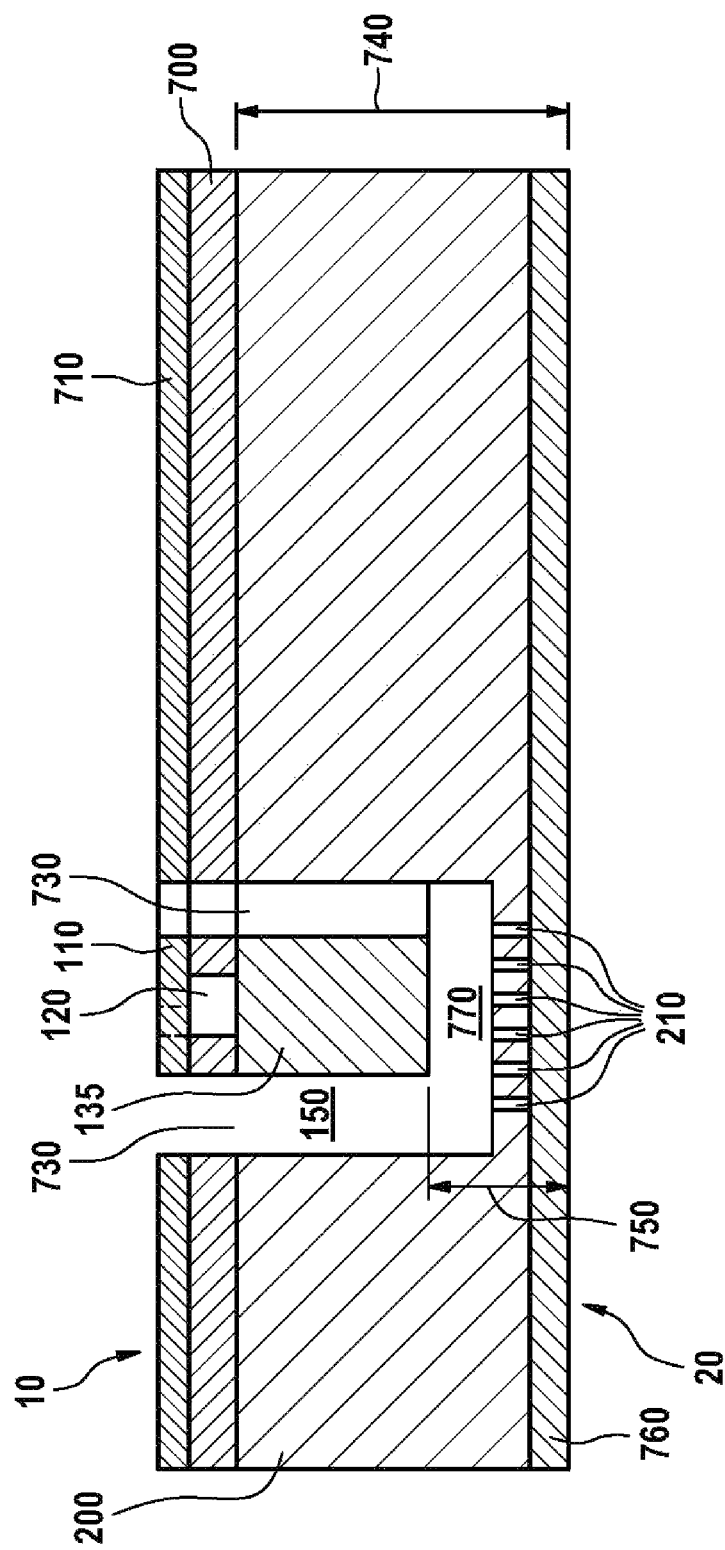
FIG. 7 shows a diagram of an intermediate step of an alternative manufacturing method, according to an example embodiment of the present invention.

A further manufacturing method that corresponds to the embodiment according to FIG. 2 is shown in FIG. 7, with reference to the depiction of an intermediate step. A lower cavity 770 is created in substrate 200 from rear side 20 with the aid of etching accesses 210. The etching accesses are subsequently closed from rear side 20 with the aid of a seal, for example a sealing layer 760. Optionally, it may in particular be provided that cavity 770 is formed with a depth 750 of 20 µm, starting from the rear side of substrate 200 or of sealing layer 760. For setting the desired thickness of the sensor element, the substrate may be thinned to a desired target thickness 740 of 380 µm to 725 µm in a subsequent step. To create diaphragm 110, initially a sacrificial layer 700 having a thickness of 1 µm to 50 µm is applied to substrate 200. A support layer 710 for forming diaphragm 110 is subsequently deposited on the sacrificial layer. The resistor lines, the double meander structure, and/or the supply lines for the resistor lines may be subsequently deposited on this support layer 710 having a thickness of 0.2 µm to 5 µm. Alternatively, these elements may be structured directly out of support layer 710 or created on the substrate. To form cavity 120, diaphragm 110 is undercut in a targeted manner by dissolving out the corresponding sacrificial material of sacrificial layer 700 in this area. Sensor structure 135, made up of diaphragm 110, cavity 120, and double meander structure as well as bridge 140, is subsequently made available from the substrate, from front side 10 of substrate 200, with the aid of suitable etching processes. A recess 150 that encloses exposed structure 135 and that is decoupled from the frame of substrate 200 is created through these etching holes 730 in conjunction with cavity 770.

Figure 8:
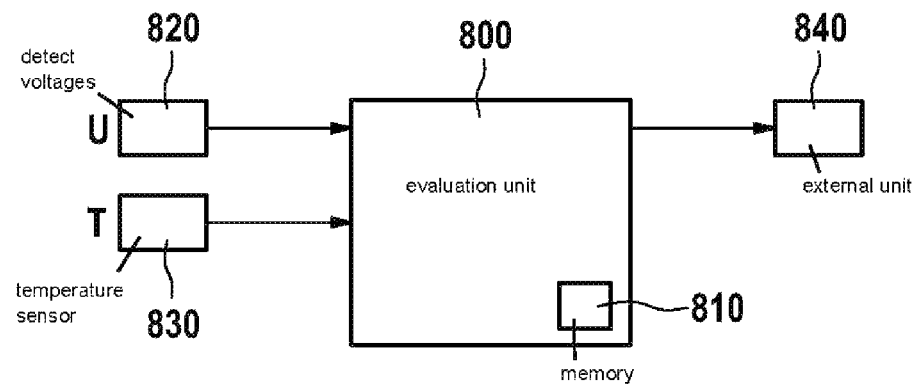
FIG. 8 schematically shows an evaluation by the gas sensor, according to an example embodiment of the present invention.

FIG. 8 illustrates an example of an evaluation unit 800 that may be used in the gas sensor according to the present invention. Evaluation unit 800 includes a memory 810 in which conversion factors, databases, or intermediate values, for example, may be stored. Evaluation unit 800 detects the voltages (820) of the Wheatstone bridge or of the double meander with the aid of an evaluation method in order to determine therefrom the thermal conductivity of the analysis gas or the presence of a certain concentration of a component of the analysis gas. This physical and/or chemical value or this information variable thus determined may be relayed to an external unit 840 for further processing. With the aid of a temperature sensor 830, evaluation unit 800 may optionally also detect a temperature value that represents the temperature of the substrate, of the diaphragm, and/or of the analysis gas. This temperature may be further used in determining the physical and/or chemical value(s) of the analysis gas.

The present invention is not limited to the exemplary embodiments described above; rather, it may be used for many different applications. By use of a processing unit in the sensor, the operation of the H2 sensor may be controlled (power saving mode, measuring ranges, for example), sensor signals may be checked for plausibility and checked for tolerances, for example (for sensor-internal monitoring, for example), signal processing may take place (for example, for computing the position or orientation, filtering the data), and communication protocols may be selected. In addition, various self-learning AI-based algorithms may be used in the processing unit for the evaluation and signal processing of the data, of the temperature sensors, and also of external sensor data.

What is claimed is:

1. A gas sensor for determining a physical and/or chemical value of an analysis gas using a thermal conductivity measurement, the gas sensor comprising:
   at least one first diaphragm including a first double meander structure made up of two resistor lines;
   an evaluator; and
   a second diaphragm that is separate from the first diaphragm, the second diaphragm including a second double meander structure made up of two resistor lines, and the second double meander structure having a resistance value that is different from the first double meander structure;

wherein the resistor lines are energized in opposite directions for the thermal conductivity measurement, and the evaluator is configured to determine at least one physical and/or chemical value that represents a property of the analysis gas, as a function of detected voltages at the double meander structure as part of a Wheatstone bridge circuit.

2. The gas sensor as recited in claim 1, wherein a cavity is situated beneath the at least one first diaphragm, the at least one diaphragm being permeable to at least a portion of the analysis gas.

3. A gas sensor for determining a physical and/or chemical value of an analysis gas using a thermal conductivity measurement, the gas sensor comprising:
    at least one first diaphragm including a first double meander structure made up of two resistor lines;
    an evaluator; and
    a second diaphragm that is separate from the first diaphragm, the second diaphragm including a second double meander structure made up of two resistor lines, and the second double meander structure having a resistance value that is different from the first double meander structure;
    wherein the resistor lines are energized in opposite directions for the thermal conductivity measurement, and the evaluator is configured to determine at least one physical and/or chemical value that represents a property of the analysis gas, as a function of detected voltages at the double meander structure as part of a Wheatstone bridge circuit,
    wherein a cavity is situated beneath the at least one first diaphragm, the at least one diaphragm being permeable to at least a portion of the analysis gas,
    wherein the evaluator is configured to determine the at least one physical and/or chemical value, which represents a property of the analysis gas, as a function of different voltages at the first and second double meander structures.

4. The gas sensor as recited in claim 3, wherein a reference double meander structure is associated with at least one of the first and second double meander structures, the reference double meander structure being connected in series to the at least one of the first and second double meander structures and is situated away from the first and/or second diaphragm on a substrate, on a stress-decoupled structure.

5. The gas sensor as recited in claim 4, wherein the at least one of the first and second diaphragm and/or the cavity is situated on a structure that is stress-decoupled with respect to a frame.

6. The gas sensor as recited in claim 5, wherein the stress-decoupled structure is connected to the frame, in particular on one side, via a bridge that is stepped in a lateral direction, it being provided that the electrical supply lines for the resistor lines are led across the bridge.

7. The gas sensor as recited in claim 5, wherein at least one temperature sensor is provided which is configured to detect a temperature of the substrate, and/or of the stress-decoupled structure and/or of the analysis gas, it being provided that the detected temperature is taken into account in determining the at least one physical and/or chemical value.

8. The gas sensor as recited in claim 1, wherein the at least one physical and/or chemical value represents a gas composition, or a gas component of a predetermined gas, or a thermal conductivity of the analysis gas.

9. A method for manufacturing a gas sensor for determining a physical and/or chemical value of an analysis gas using a thermal conductivity measurement, the method comprising:
    creating at least one first diaphragm on a substrate using micromechanical methods; and
    creating a double meander structure made up of two resistor lines, as part of a Wheatstone bridge circuit, on the at least first diaphragm,
    wherein a cavity is created beneath the at least one diaphragm, the at least one diaphragm being created in such a way that it is permeable to at least a portion of the analysis gas,
    wherein the at least one diaphragm and/or the cavity is situated on a structure that is stress-decoupled with respect to a frame,
    wherein the stress decoupling of the structure takes place in the substrate via the creation of a bridge that is stepped and/or fastened to one side of the frame, it being provided that electrical supply lines for the resistor lines are created on the bridge.

10. A method for determining a physical and/or chemical value of an analysis gas using a thermal conductivity measurement, for use in an evaluation unit of a gas sensor, comprising the following steps:
    for the thermal conductivity measurement, energizing two resistor lines of a first double meander structure on a first diaphragm in opposite directions; and
    determining at least one physical and/or chemical value that represents a property of the analysis gas, as a function of detected voltages at the double meander structure as part of a Wheatstone bridge circuit,
    wherein the gas sensor includes a second diaphragm that is separate from the first diaphragm, the second diaphragm including a second double meander structure made up of two resistor lines, and the second double meander structure having a resistance value that is different from the first double meander structure.

11. The method as recited in claim 10, wherein the method determines a gas composition, or a gas component of a predetermined gas, or a thermal conductivity of the analysis gas.

12. A method for determining a physical and/or chemical value of an analysis gas using a thermal conductivity measurement, for use in an evaluation unit of a gas sensor, comprising the following steps:
    for the thermal conductivity measurement, energizing two resistor lines of a first double meander structure on a first diaphragm in opposite directions; and
    determining at least one physical and/or chemical value that represents a property of the analysis gas, as a function of detected voltages at the double meander structure as part of a Wheatstone bridge circuit,
    wherein the gas sensor includes a second diaphragm that is separate from the first diaphragm, the second diaphragm including a second double meander structure made up of two resistor lines, and the second double meander structure having a resistance value that is different from the first double meander structure, and
    wherein the determining of the at least one physical and/or chemical value, which represents the property of the analysis gas, is as a function of different voltages at the first and second double meander structures.

\* \* \* \* \*